Jan. 7, 1930.  E. B. LOCKE  1,742,819
SCALE
Filed Feb. 28, 1922  9 Sheets-Sheet 1
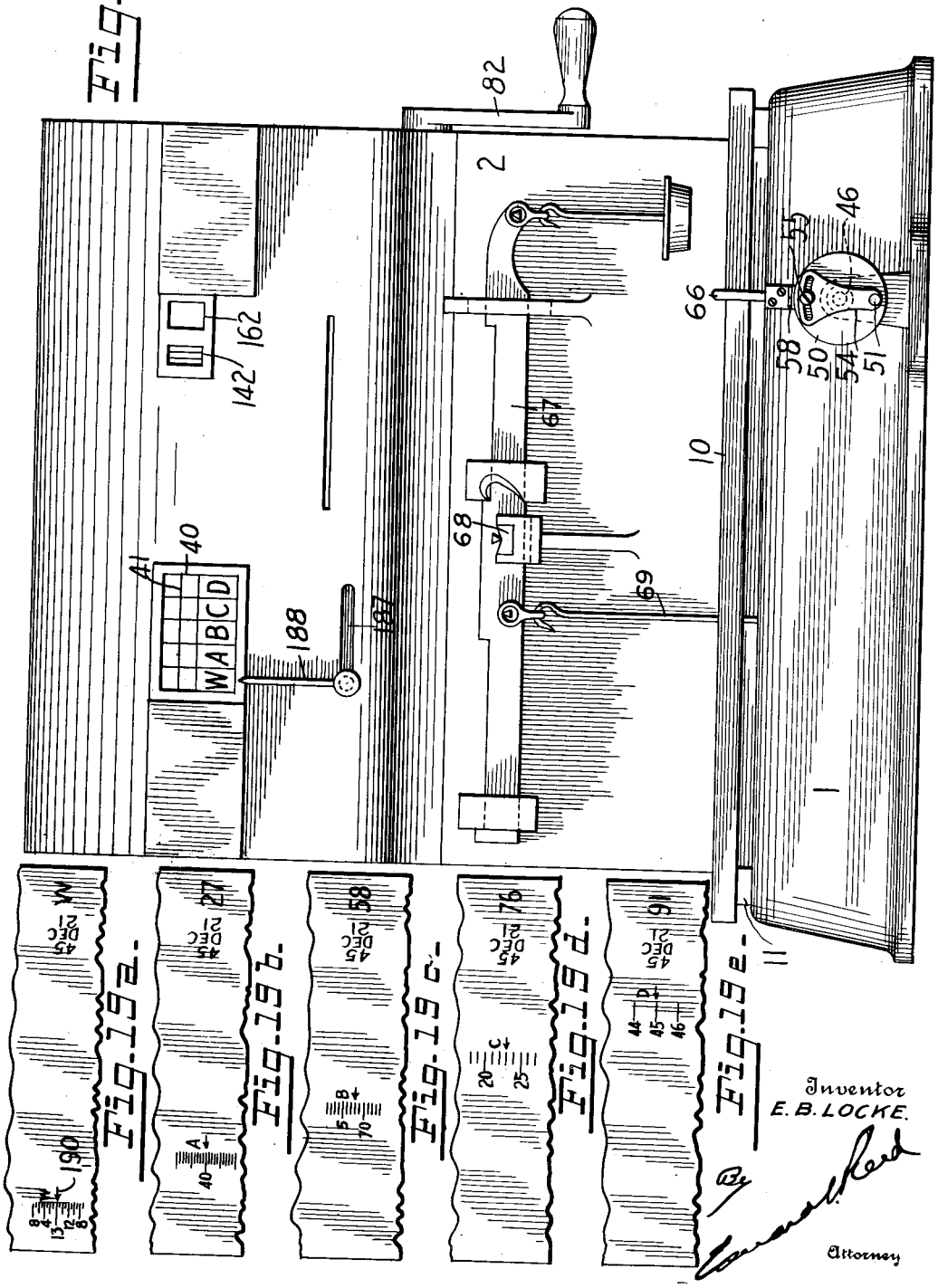
Inventor
E. B. LOCKE.
Attorney

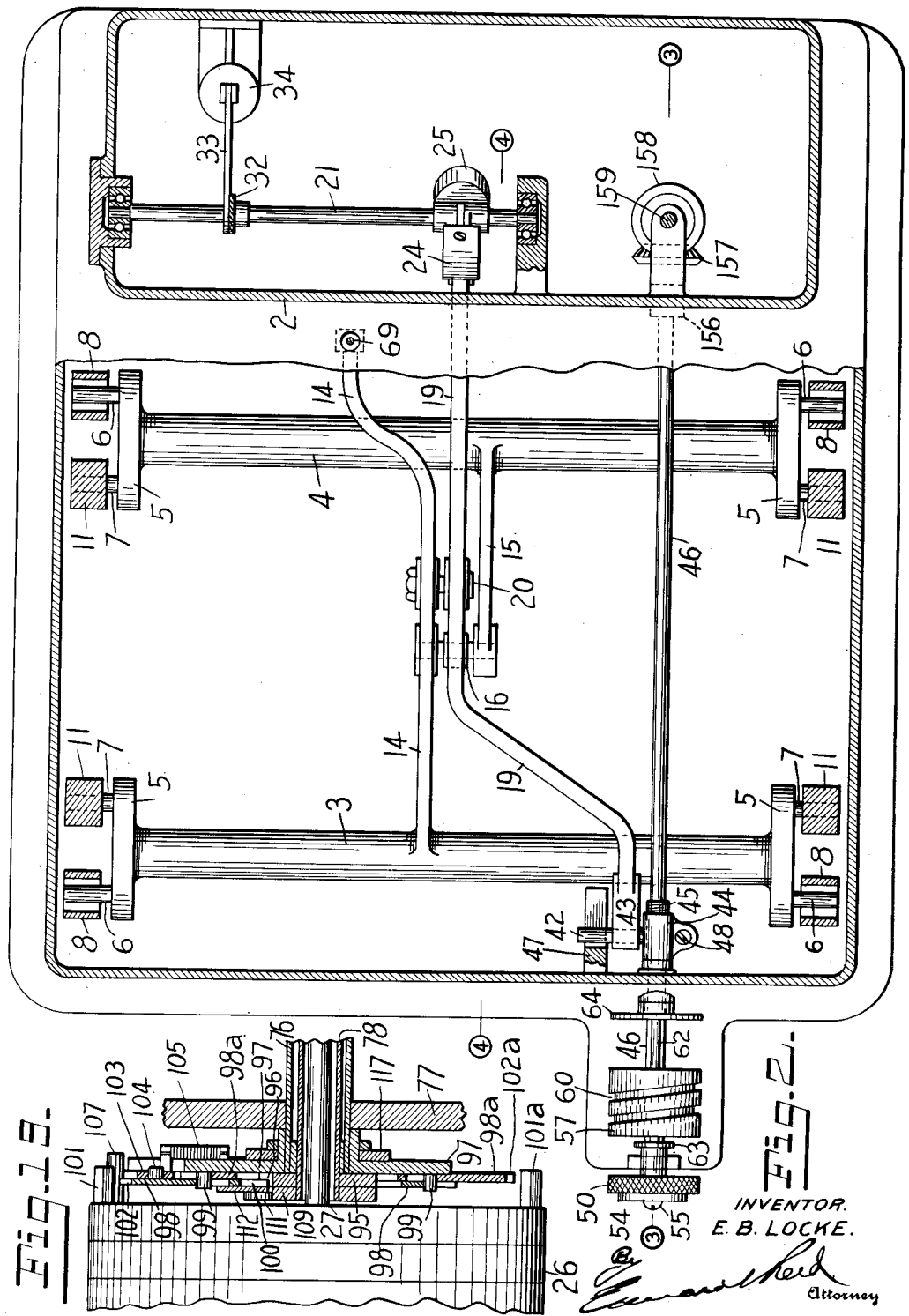

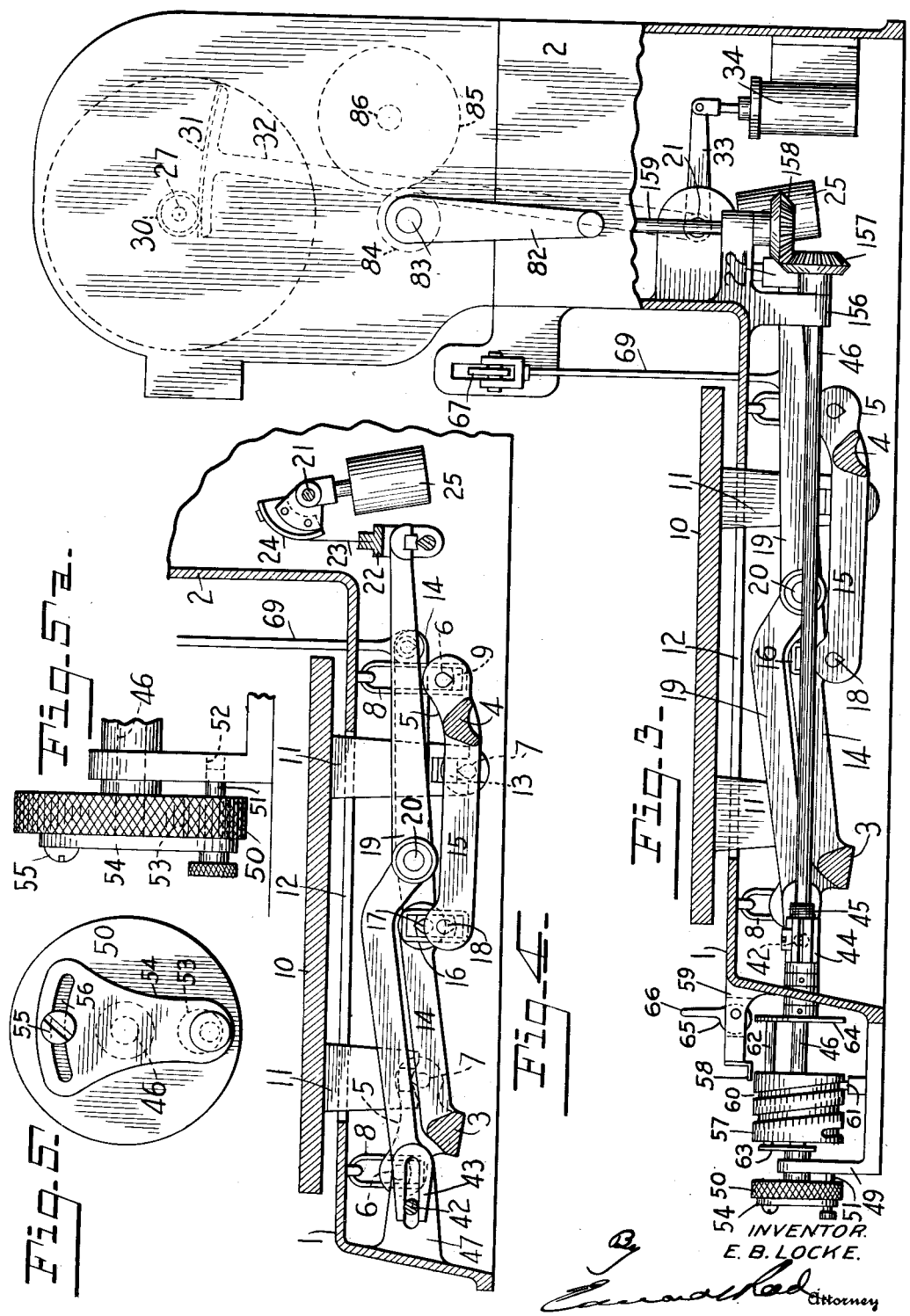

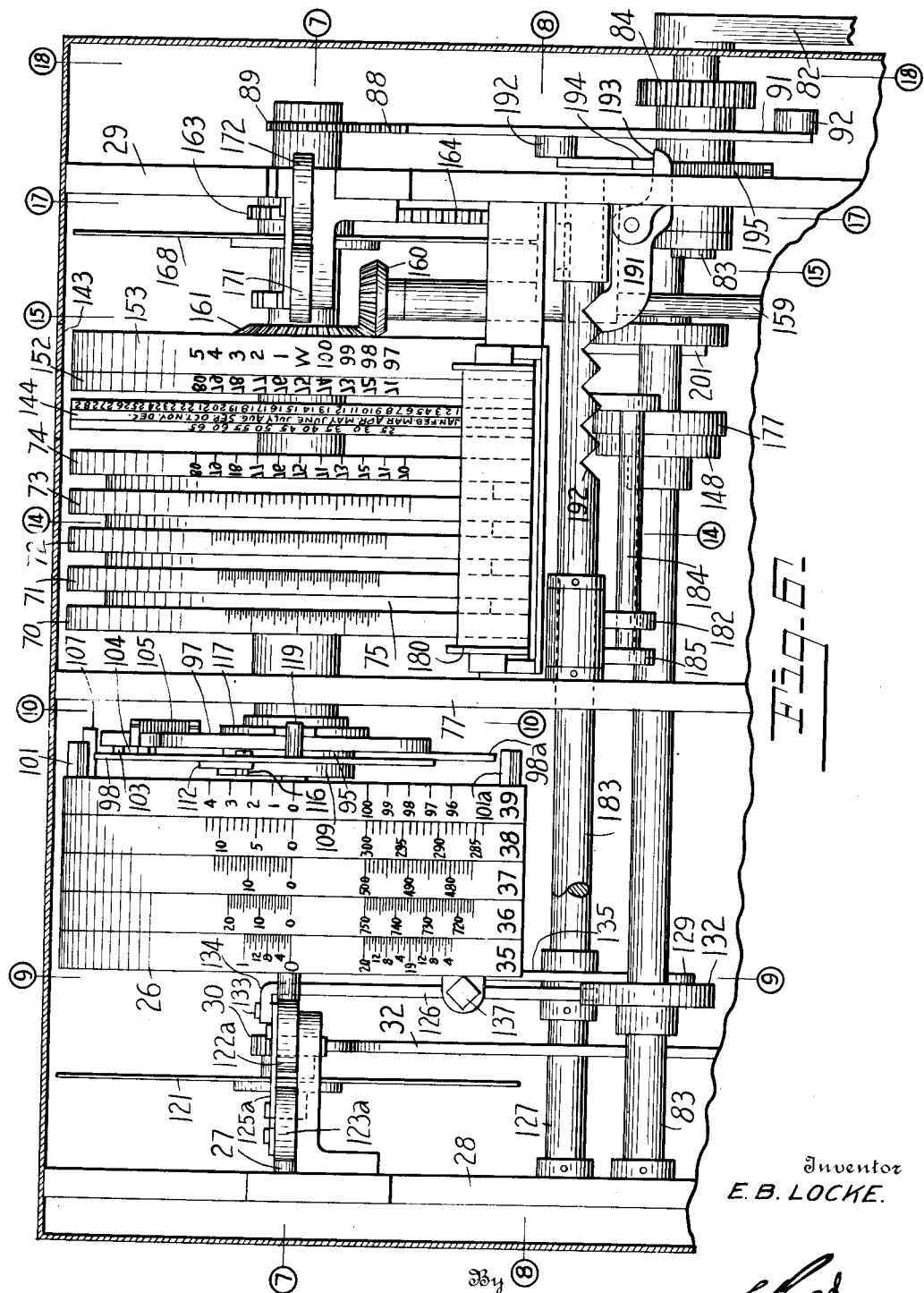

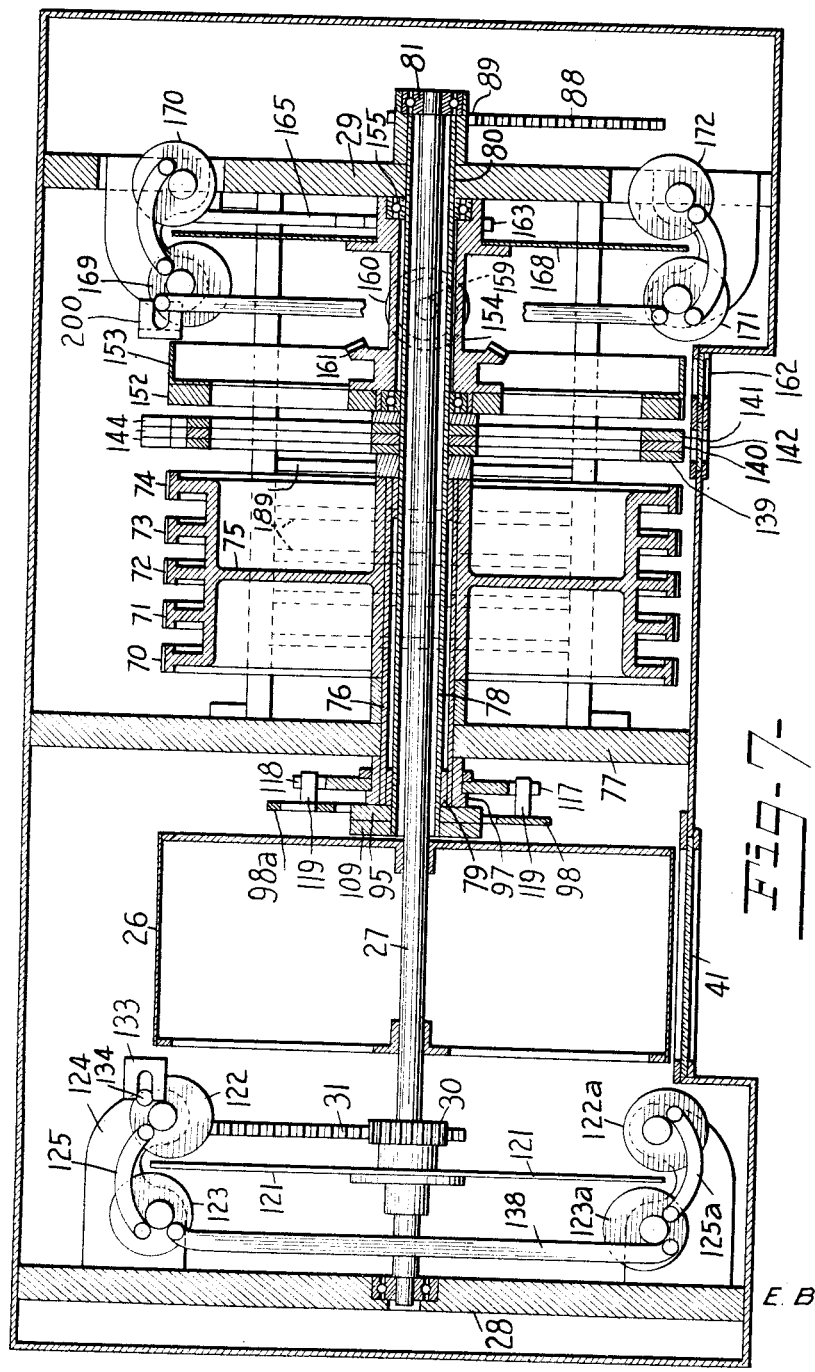

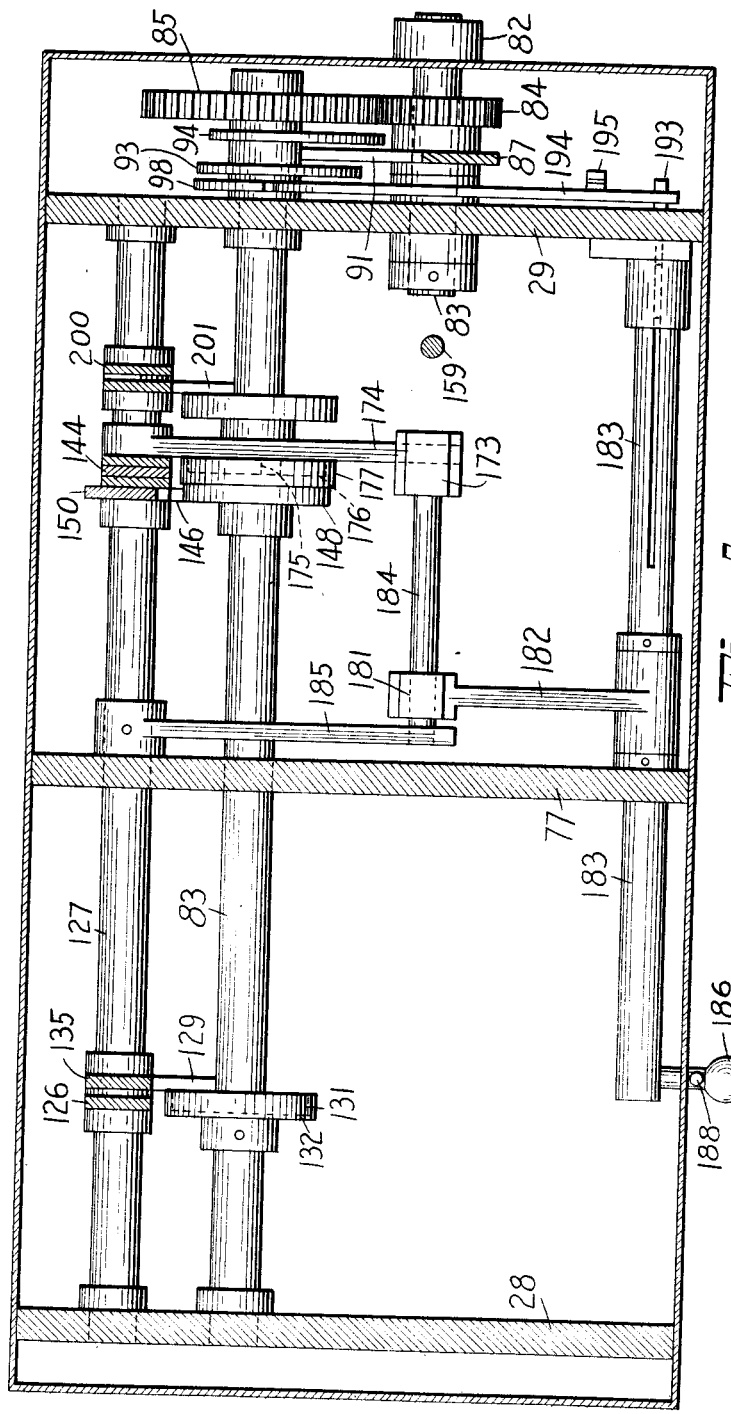

Jan. 7, 1930.  E. B. LOCKE  1,742,819
SCALE
Filed Feb. 28, 1922  9 Sheets-Sheet 7
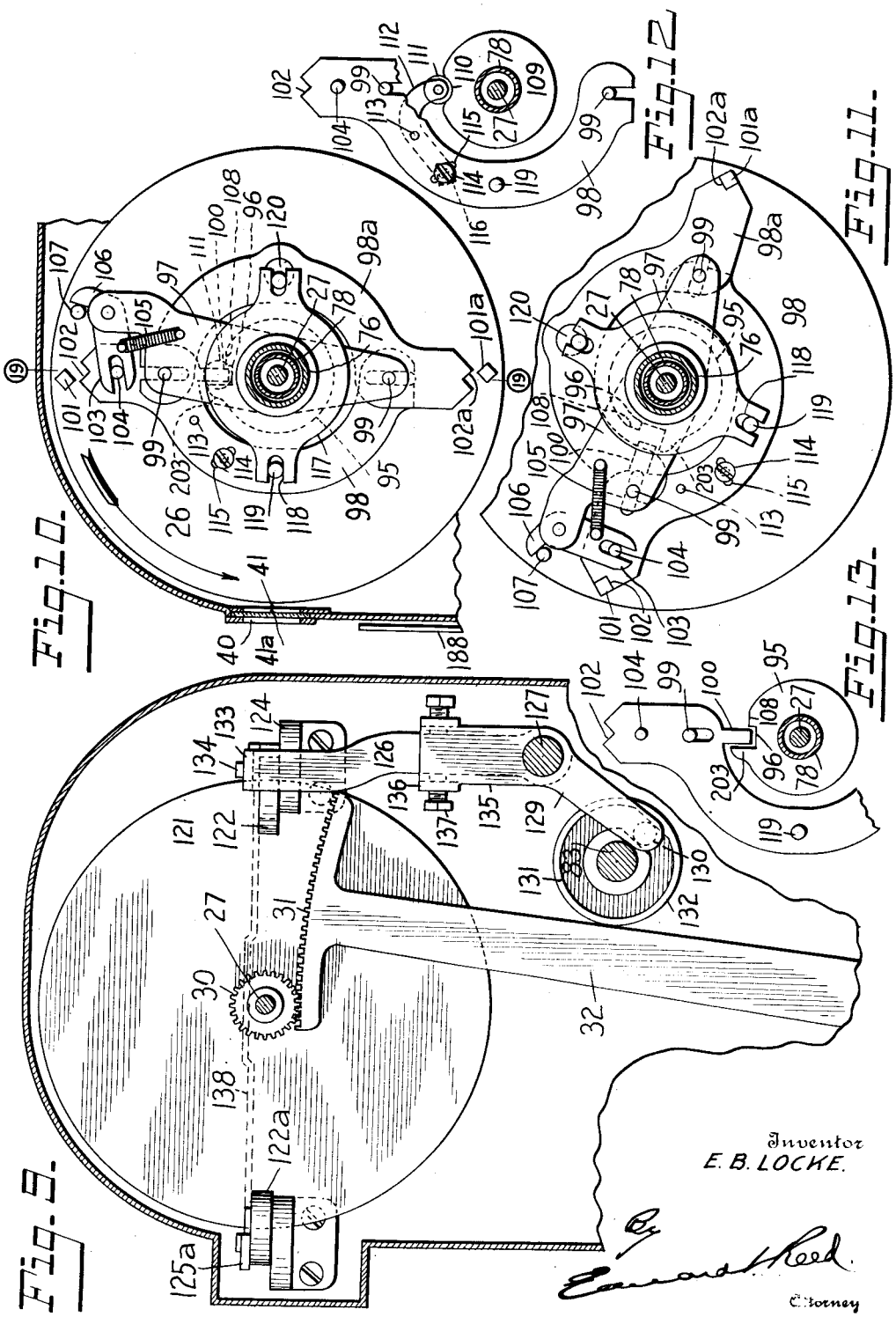
Inventor
E. B. LOCKE.

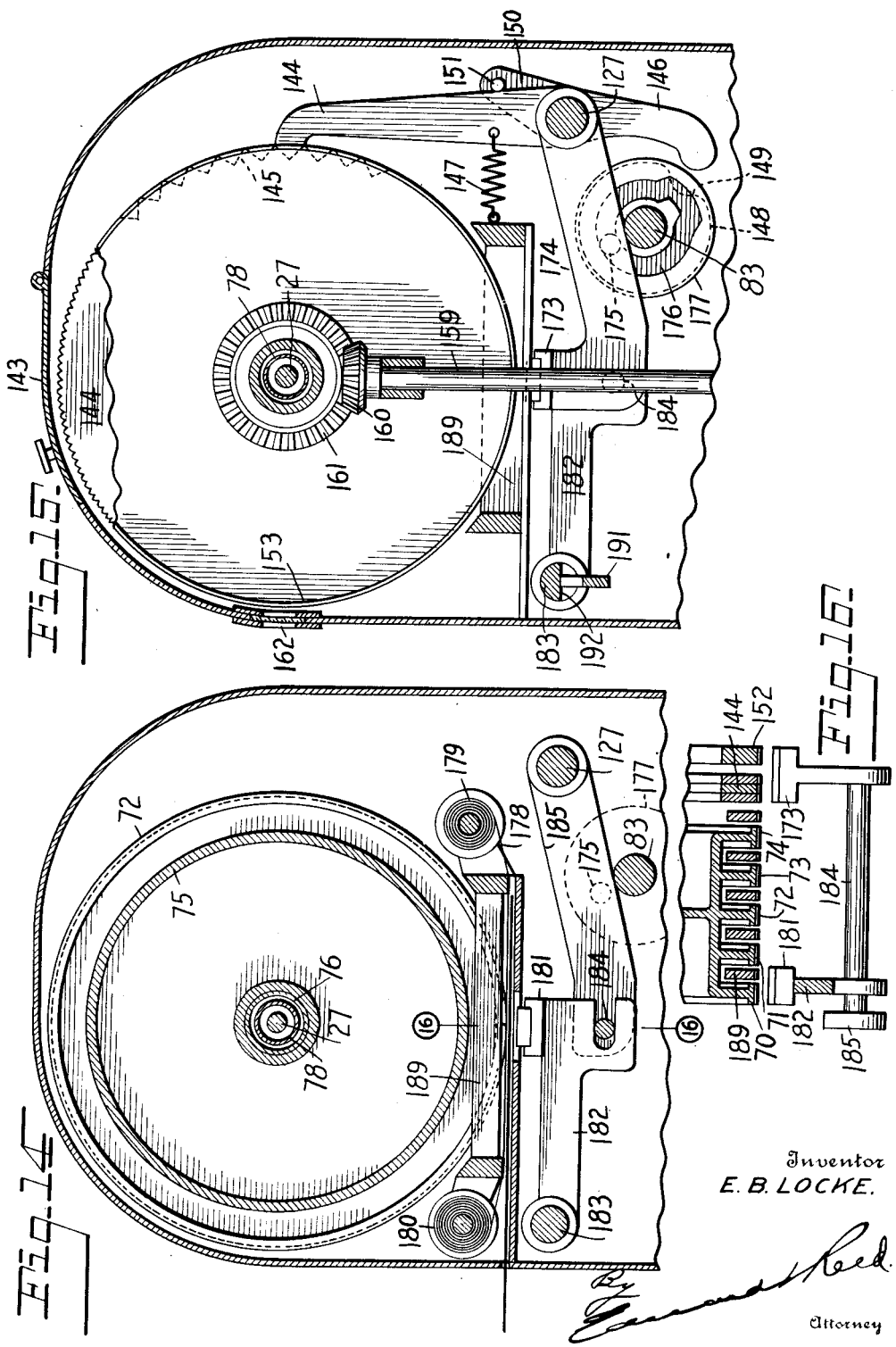

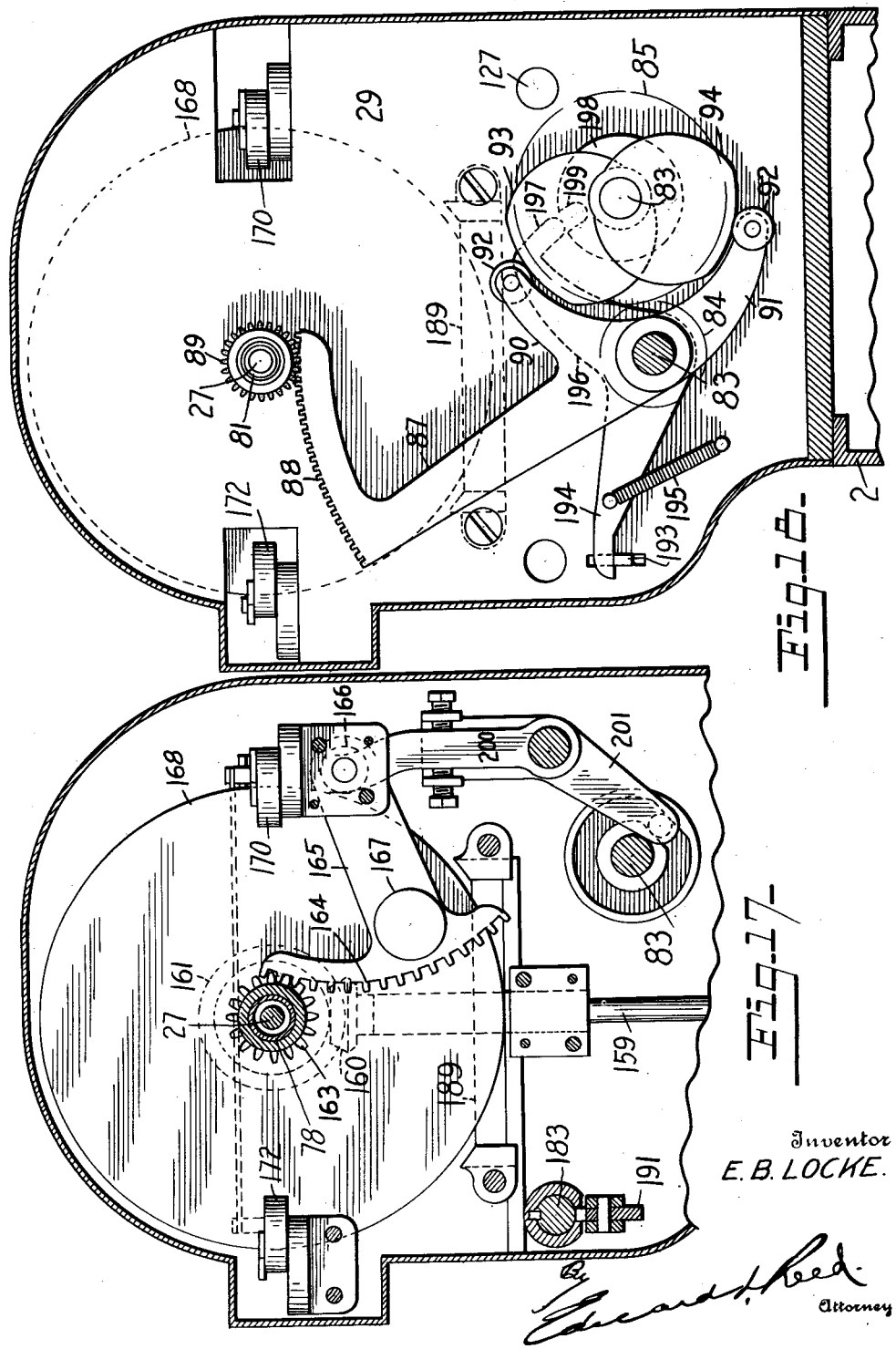

Patented Jan. 7, 1930

1,742,819

UNITED STATES PATENT OFFICE

EDWARD B. LOCKE, OF DAYTON, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

SCALE

Application filed February 28, 1922. Serial No. 539,877.

This invention relates to scales, and more particularly to a counting scale.

One object of the invention is to provide a counting scale which can be adjusted to accommodate it to the weight of any article within the limits of its capacity.

A further object of the invention is to provide such a scale which will be simple in its construction and accurate in its operation; and which may be quickly and easily adjusted.

A further object of the invention is to provide a counting scale with mechanism for printing a record of the count.

A further object of the invention is to provide a scale with a printing mechanism which will print a record corresponding accurately with the indicated count or weight and which will not interfere with the operation of or impose a burden on the scale.

Other objects of the invention will appear as the mechanism is described in detail.

In the accompanying drawings Fig. 1 is a front elevation of a scale embodying my invention; Fig. 2 is a plan view of the same, partly in section; Fig. 3 is a sectional view taken on the line 3—3 of Fig. 2, showing a portion of the casing in elevation; Fig. 4 is a sectional view taken on the line 4—4 of Fig. 2; Fig. 5 is a detail view of the operating handle for adjusting the counting mechanism; Fig. 5ª is a side elevation of said operating handle; Fig. 6 is a front elevation of the indicating and printing mechanism with the casing in section; Fig. 7 is a longitudinal view taken on the line 7—7 of Fig. 6; Fig. 8 is a horizontal sectional view taken on the line 8—8 of Fig. 6; Fig. 9 is a vertical section taken on the line 9—9 of Fig. 6; Fig. 10 is a vertical section taken on the line 10—10 of Fig. 6; Fig. 11 is a view similar to Fig. 10 showing the locking devices in their operative positions; Fig. 12 is a detail view of one of the locking plates, partly broken away; Fig. 13 is a detail view of one of the locking plates with its cooperating disk; Fig. 14 is a section taken on the line 14—14 of Fig. 6; Fig. 15 is a section taken on the line 15—15 of Fig. 6; Fig. 16 is a section taken on the line 16—16 of Fig. 14; Fig. 17 is a section taken on the line 17—17 of Fig. 6; Fig. 18 is a section taken on the line 18—18 of Fig. 6; Fig. 19 is a section taken on the line 19—19 of Fig. 10; and Figs. 19ª, 19ᵇ, 19ᶜ, 19ᵈ, 19ᵉ are portions of a record strip showing records taken from the different type carriers of the printing mechanism.

In these drawings I have illustrated one embodiment of my invention and have shown the same as comprising a counting mechanism having associated therewith a printing mechanism by means of which a record of the count may be taken. It will be understood, however, that the counting mechanism may be used either with or without the printing mechanism and that the utility of the printing mechanism is not limited to the particular scale here shown, and, further, that various other computing mechanisms may be substituted for the counting mechanism here shown, the present embodiment having been chosen for the purpose of illustration only.

In that form of the scale here illustrated I have provided a main frame which is here shown in the form of a casing comprising a base 1 and an upright portion 2. Mounted on this main frame is the weighing mechanism which may be of any suitable character and is here shown as a well known type.

As shown in Figs. 2 to 4 the weighing mechanism comprises two parallel rods, or rock arms, 3 and 4, each having at both ends a cross head 5 carrying axially extending pivot pins 6 and 7. The outer pivot pins 6 of each cross head are supported on suitable bearings carried by the main frame and, as here shown, these bearings are in the form of yokes 8 having in their lower portions bearing blocks 9 with which the pivot pins 6 engage, the pivot pins being preferably provided with knife edges as is customary in scale construction. The pivot pins 7 carried by the inner ends of the cross heads 5 serve to support a platform 10 which is provided with four standards, or legs, 11 which extend through an opening 12 in the base 1 and are provided at their lower ends with bearing blocks 13 which engage the pivots 7, thereby causing the platform to be supported on the pivot pins. Each rod, or rock arm, 3 and 4, has an inwardly extending arm, 14 and 15, which may be arranged parallel one with the other and the inner ends of which are pivotally connected one to the other by a double pivot structure, here shown as consisting of a yoke 16 having at its upper and lower ends bearing blocks to engage pivot pins 17 and 18 carried respectively by the arms 14 and 15. That portion of the weighing mechanism above described is of a known construction and forms no part of the present invention except in so far as it enters in combination with the other parts of the mechanism. Operatively connected with, and forming a part of, the weight mechanism is a lever 19, which is pivotally connected between its ends with one of the inwardly extending arms carried by the rock shafts. In the present device the lever 19 is pivotally mounted on the rearwardly extending arm 14, the pivotal connection being preferably formed, as shown at 20, beyond the point of connection of the arm 14 with the arm 15. The rear portion of the lever 19 extends rearwardly to a point adjacent to and preferably in line with the upwardly extending portion 2 of the casing and is there operatively connected with the rock shaft 21. The connection may take any suitable form but, as here shown, the rear end of the arm 19 is pivotally connected with a yoke 22 with which is connected a strap 23 the upper portion of which is secured to and extends about a segment 24 which is rigidly mounted on the shaft 21, the shaft being counterweighted, as shown at 25, to counterbalance the load on the weighing mechanism.

The computing mechanism may take various forms and the computation may be based on various units of computation, but the present machine is designed primarily to compute, or count, the number of articles in a mass of identical articles placed on the load platform. The counting or computing mechanism comprises an indicator which is connected with the weighing mechanism by suitable actuating devices. The indicator may take various forms and may be connected with the weighing mechanism in various ways, but I prefer that the indicator shall be in the form of a drum 26 and as here shown this drum is rigidly secured to a shaft 27 journaled at its ends in frame members 28 and 29 carried by and forming part of the main frame. Rigidly secured to the shaft 27 is a pinion 30 with which meshes a toothed segment 31 which is carried by an arm 32 rigidly secured to the rock shaft 21. If desired suitable means may be provided for cushioning the movements of the parts and as here shown the shaft 21 has rigidly secured thereto an arm 33 by means of which it is connected with a dash pot 34.

As has been stated, the indicator may take various forms but I prefer that it shall be provided with a plurality of series of indications, or scales, each of which is graduated differently from the others and any one of which may be utilized to indicate the number of articles placed upon the platform 10. As here shown, the drum 26 is divided into five circumferential sections, as shown at 35, 36, 37, 38 and 39. The left hand section 35 is graduated to indicate pounds and ounces and may be utilized to weigh an article placed upon the platform. The other sections 36, 37, 38 and 39 are provided with indicating lines, or graduations, spaced fixed distances apart, the graduations of the successive sections being in each instance spaced a greater distance apart than are the lines or graduations of the preceding section, and these lines are numbered. The casing 2 which encloses the indicating drum is provided with a sight opening 40 (Figs. 1 and 10) through which the indications on the several sections of the drum may be read and this casing also carries a reading line which extends across the sight opening and which, as here shown, consists of a fine wire 41 extending lengthwise of the opening 40 and arranged close to the periphery of the drum. If desired, in order to secure an absolutely accurate registration of the reading line with the indicating line on the drum a second wire 41ª may be provided in the same horizontal plane with the wire 21 and spaced a short distance therefrom so that by alining the two wires with the indicating line an absolutely accurate reading may be had.

When it is desired to count out a specified number of articles or to determine the number of articles in a given mass one article is placed upon the platform 10 and this will move the indicator 26 a distance corresponding to the weight of that article and will bring the first unit indication of some one of the several scales, 36, 37, 38 or 39 approximately into line with the sight opening. If the unit indication of some one of the scales, or series of indications, registers exactly with the reading line it will be apparent that that particular scale will be advanced one space or indication for each additional article of like kind placed upon the platform and will, therefore, indicate the total number of articles in a mass of articles placed on the platform. However, in practice it very frequently happens that the article or unit which is to be counted will be of such a weight that the unit line of none of the indicator scales will register with a reading line at the sight opening and when this happens an accurate count can not be had. I have, therefore, provided means for so adjusting the weighing mechanism with relation to the counting mechanism that it may be adjusted to cause the units indication of some one of the series of indications or scales to register with the sight opening when any article, within the limits of the capacity of the counting mechanism, is placed upon the platform, thereby enabling an absolutely accurate count to be had of any article or unit regardless of its weight. It will be understood, of course, that if desired, particularly in the case of very light articles, two or more such articles may be utilized as the unit to which the indicator is initially set and when this is done it will be obvious that the number indicated on the drum must be multiplied by the number of articles constituting the unit. For example, in counting small sheets of paper, the unit would usually consist of a bundle of sheets. The adjustment of the weighing mechanism to cause some one of the several series of indications on the indicating drum to be moved into registration with the reading line at the sight opening may be accomplished in various ways, but I prefer to do this by adjusting the fulcrum of the lever 19 of the weighing mechanism. I have, therefore, fulcrumed the forward end of the lever 19 on an adjustable pivot pin 42, the lever having a bifurcated end 43 to embrace the pin 42. By moving the pin, or fulcrum, lengthwise of the lever the fulcrum may be so adjusted as to secure the desired registration on the indicator and this adjustment is maintained during the particular counting operation for which it is made. The adjustment of the fulcrum may be secured in different ways but, as here shown, the fulcrum pin is secured to and extends laterally from a screw threaded sleeve 44 which is mounted on a screw threaded portion 45 of a rod 46 which is journaled in the front wall of the base 1 and is provided at its outer end with means for rotating the same. The fulcrum pin and its supporting sleeve 44 being held against rotation it will be apparent that the sleeve will travel lengthwise of the rod and therefore lengthwise of the lever. As here shown, the free end of the fulcrum pin is mounted in a slotted bracket 47 which permits of its movement lengthwise of the lever and holds it against rotation. Preferably the sleeve 44 is split longitudinally and is clamped about the threaded portion 45 of the rod 46 by a screw 48, thus enabling any wear to be taken up and a firm, snug connection provided between the two parts which will effectually prevent any lost motion. The outer end of the rod 46 extends beyond the front wall of the base and is journaled in a bracket 49. Secured to the outer end of this rod is an operating knob, or handle, 50 by means of which the rod may be rotated. This knob is normally locked against movement by a pin 51 slidably mounted thereon and extending into an opening 52 in the bracket 49. In order that the knob may occupy its locked position when the indicator is exactly at zero, the pin 51 is adjustable with relation to the knob. To this end it is mounted in an eccentric bushing 53 which is journaled in the knob 50 and to which is rigidly secured a plate 54 which in turn is secured in adjusted positions on the face of the knob by means of a screw 55 extending through a segmental slot 56 in the end of the plate. By adjusting the plate the eccentric bushing will be rotated and the position of the pin 51 with relation to the knob will be adjusted. In this manner very fine adjustments may be secured.

If desired, the adjusting mechanism may be provided with a device which will indicate the amount of adjustment imparted to the fulcrum and thereby enable the same to be quickly adjusted to a predetermined position. For example, where quantities of the same article are counted at more or less frequent intervals, the operator may ascertain the position to which the fulcrum is adjusted, when the first count is made, and upon subsequent operations for counting the same article it will be only necessary to adjust the fulcrum to the same position and it will not be necessary to carefully note the registration of the indicating drum with the reading line as this will result from setting the fulcrum in the predetermined position. As here shown, I have connected with the setting rod 46 a spiral indicator, or drum, 57 having on its periphery a series of graduations which may be numbered and which move past a pointer 58 on a bracket 59 carried by the base 1. Preferably the series of indications extends twice about the drum 57 in order that very fine graduations may be secured and that they may cover the whole range of operation of the counting mechanism. I have, therefore, arranged the series of graduations in spiral form and have provided means for not only rotating the indicator 57 with the shaft 46 but for moving the same lengthwise of that shaft. To this end the drum is provided with a spiral groove 60 with which engages a pin 61 mounted on the bracket 49, thereby causing the drum to move lengthwise of the shaft when it is rotated and causing the spiral graduations to travel past the pointer 58. The drum may be mounted on the shaft 46 in any suitable manner but in the present instance it is loosely mounted thereon and is rotated therewith by means of a rod 62 extending through the same near its periphery and connected at its forward end with an arm 63 rigidly secured to the rod 46 and supported at its other end by a disk 64 also secured to the rod 46. The disk 64 forms a locking device by means of which the rod 46 may be secured in its adjusted positions. As here shown, an eccentric disk 65 is pivotally mounted on the bracket 59 and provided with an operating handle 66. The axis of the eccentric disk is so arranged that when it is moved in one direction the disk 65 will come in contact with the edge of the disk 64, thereby locking the latter against movement.

If desired a tare beam may be provided, as shown at 67 in Fig. 1 to enable a receptacle for the articles to be counted to be placed upon the platform and the weighing mechanism balanced before the counting mechanism is adjusted to the unit to be counted. In the present instance this beam is fulcrumed on a bearing 68 arranged between its ends and is connected on one side of its fulcrum by means of a rod 69 with the rear end of the arm 14 carried by the rock shaft 3. The beam is otherwise of ordinary construction and is provided with the usual balancing devices.

The mechanism by means of which a record corresponding to the indication on the indicator drum 26 may be printed may take various forms and may be connected with the indicating drum in various ways, but I prefer that this printing mechanism should be mounted wholly independently of the indicator drum and that the type carriers thereof should be moved independently of the indicator drum to bring one or more of them into a position to print a record corresponding to the indication on the drum, the drum serving to control the position to which the type carrier, or carriers, are adjusted. In the present instance I have shown the printing mechanism as comprising five type carriers, 70, 71, 72, 73, and 74, which are preferably rotatable about an axis coincident with the axis of the indicator drum 26. These several type carriers may be mounted in any suitable manner but in the present device they are integrally connected and constitute a single printing drum, which may be indicated as a whole by the reference numeral 75. This printing drum is mounted on a sleeve or hollow shaft 76 which extends through an intermediate frame member 77 and also extends about and is rotatably mounted on a second or inner hollow shaft or sleeve 78 which sleeve is rotatably mounted at one end in a bearing 79 in the end of the outer sleeve 76 and is rotatably mounted at its other end in a bearing 80 carried by the frame member 89. This inner sleeve extends about the shaft 27 for the indicator drum 26 but is out of contact with this shaft at all points except at its right hand end where the shaft 27 is journaled in an antifriction bearing 81 carried by the sleeve 78. It will be apparent, therefore, that the type carriers are supported independently of the indicator drum and are rotated independently of the indicator drum to bring the same into printing position.

Rotatory movement may be imparted to the type carrier, or the printing drum, in any suitable manner, but in the present instance this is accomplished through the medium of the two telescoping sleeves 76 and 78 which are connected one to the other in a manner which will be hereinafter described. In the present machine the printing mechanism is operated by means of a crank 82 arranged on the outer side of the casing and mounted on a shaft 83 which is journaled in the frame member 29 and extends through the casing wall. Secured to this shaft is a pinion 84 which meshes with a gear 85 on a shaft 86 which carries a series of cams which operate various parts of the mechanism. Power is transmitted from the cam shaft 85 to the inner sleeve, or hollow shaft, 78 by means of an arm, or lever, 87 which is pivotally mounted on the shaft 83 and has at its outer end a segmental rack 88 which meshes with a pinion 89 rigidly secured to the sleeve 78. Rocking movement is imparted to the arm, or lever, 87 through a cam, or cams, mounted on the shaft 86. As here shown, the lever 87 has rigidly secured thereto two other arms 90 and 91 each of which carries a projection, or roller, 92, arranged to be engaged by cams 93 and 94 rigidly secured to the shaft 86 and so arranged thereon with relation to the arms 90 and 91 that the rotation of the shaft will impart rocking movement to the lever, thereby moving the lever, and, consequently, the shaft 78, first in one direction and then in the other when the crank is moved continually in one direction. While I have shown the double cam arrangement in the present construction it will be obvious that any suitable connection may be interposed between the lever 87 and the cam shaft 86.

The movement of the inner hollow shaft 78 is transmitted to the outer hollow shaft 76 with which the type carriers are connected by means of suitable connections which normally connect the two shafts one with the other but will automatically disconnect the same when the printing drum has been moved into a position to print a record corresponding to the indication on the indicator drum 26. This connecting mechanism may take various forms and as here shown it comprises a disk 95 rigidly secured to the inner shaft 78 and having in the periphery thereof a notch 96. Rigidly secured to the outer shaft 76 adjacent to the disk 95 is a lever 97 having parts extending on opposite sides of the shaft. Extending about the disk 95 is a curved plate 98 which is connected with the lever 97 by pin and slot connections arranged on opposite sides of the shaft, as shown at 99, which serve to cause the plate 98 and the lever 97 to rotate together, but permit the plate to have radial movement relatively to the lever and relatively to the disk 95. The plate 98 also has an inwardly extending finger 100 which rests normally in the recess 96 of the disk 95 so that the rotation of the disk with the inner shaft will impart rotation to the plate 98, the lever 97, the outer shaft 76 and the type carriers, or printing drum. The plate 98 forms one part of a locking device, the other part of which is carried by or rigidly connected with the indicator drum 26 and means are provided and controlled by the position of the indicator drum to impart radial movement to the plate 98 to cause the locking members to be brought into cooperative relation. As here shown, the indicator drum has a stud 101, which is preferably angular in cross section, rigidly secured to the end thereof and the end of the plate 98 is provided with a recess 102 adapted to embrace the stud 101 when radial movement has been imparted to the plate. The movement of the plate to cause it to operatively engage the stud will move the finger 100 out of the notch 96 in the disk 95 and thereby permit the disk and the inner shaft to continue their rotation independently of the outer shaft and the printing drum, which are now locked rigidly to the indicator drum. Radial movement may be imparted to the plate 98 in various ways. In the present instance a rock arm 103 is pivotally mounted on the upper end of the lever 97 and has a pin and slot connection with the plate 98, as shown at 104. A spring 105 holds the arm 103 and, consequently, the plate 98 in their normal positions with the finger 100 in the recess 96. Rigidly connected with the rock arm is a finger 106 arranged to engage a pin, or stud, 107 carried by or rigidly connected with the indicator drum. This pin is so arranged with relation to the stud 101 that as the plate 98 and lever 97 rotate the finger 106 will engage the pin 107 and impart radial movement to the plate 98 and cause the plate to operatively engage the stud 101. It will be understood that the indicator drum 26 will have been advanced from its normal position, which is shown in Fig. 10, to an indicating position corresponding to the load which has been placed upon the platform 10, as shown in Fig. 11. Consequently, the printing drum will be rotated until the plate 98 is actuated to lock the outer shaft and the printing drum to the indicator drum. The type on the type carriers is so arranged with relation to the indications on the indicator drum that when the two parts are locked one to the other the type which are in printing position and the indications which are in indicating position will correspond. To facilitate the clearance of the notch 96 by the finger 100 the disk 95 is cut away at the rear side of the notch, as shown at 108 thus shortening the rear side wall of the notch but providing at this point a cam surface which will engage the end of the finger and force the plate outwardly into engagement with the stud if the rock arm 103 has not completed this movement.

Means are also provided for adjusting the movement of the locking plate 98 and for retaining this plate in its locking position until the inner shaft is restored to its normal position with relation to the plate. To this end I have mounted on the inner shaft, alongside the disk 95, a second disk 109 having in its upper end a curved recess 110 adapted to receive a roller 111 carried by an arm 112 pivotally mounted at 113 on the plate 98. The arm extends beyond the pivot 113 and is adjustably secured to the plate by means of a bolt 114 extending through a slot 115 in the plate and provided with a nut 116 by means of which the arm may be clamped against the sleeve in adjusted positions. It will be noted that the shape of the arm is such that its movement about the axis 113 will move the roller 111 substantially radially of the disk 109. The first movement of the disk 109 with relation to the plate 98, after the latter has been actuated to disconnect the finger 100 from the plate 95, will cause the roller to move out of the notch 110, if it has not already been moved clear of the same, and to engage the periphery of the disk. The arm 112 is so adjusted with relation to the disk and the locking plate that when the roller is in engagement with the periphery of the disk the plate will be held firmly in contact with the stud 101. Because of the adjustability of the arm any wear or looseness in the operation of the mechanism may be taken up. So long as the roller remains on the periphery of the disk the plate will be held in its locking position, thereby maintaining the connection between the printing drum and the indicator drum until the printing operation has been completed, as hereinafter described, and the shaft 78 rotated in a reverse direction to restore the parts to their normal positions.

If desired, the locking mechanism may be of such a character as to engage the drum on opposite sides of its center, thus giving a firmer connection and one that is less likely to distort or strain the drum or its shaft. To this end I have, in the present instance, shown a second locking plate 98ª similar to the plate 98 but arranged on the opposite side of the disk 95 and having its notched end 102ª diametrically opposite the notched end 102 of the first plate. A second stud 101ª is connected with the drum and the two plates 98 and 98ª are so connected one with the other that they will move simultaneously in opposite directions, thus causing both to engage the respective studs at the same time. The connection is here shown as a plate 117 which is loosely mounted on the hub of the lever 97 and has its ends slotted, as shown at 118 to receive pins 119, secured to the respective plates 98 and 98ª. It will be noted that the plate 98ª has no finger corresponding to the finger 100 but that movement is imparted thereto through the plate 117 by the movement of the plate 98. The plate 98ª is guided by slots which receive the pins 99 which serve to connect the plate 98 with the lever 97. Preferably one of the pins 119 is adjustable so that all lost motion can be eliminated and, as here shown, the pin 119 carried by the plate 98ª is mounted on an eccentric stud 120 which is rotatably mounted on the plate 98ᵃ and by the adjustment of this stud the position of the pin with relation to the plate 117 may be adjusted.

In as much as the indicator drum serves to control the movement of the printing drum and it is important that the indicator drum should not be moved from the position to which it has been moved by the articles on the scale platform, it is desirable that some means be provided for locking the same against movement when the trip finger 106 engages the pin 107. I have, therefore, provided a locking device which is actuated by the movement of the operating crank prior to the operation of the printing drum. As here shown, this locking mechanism for the indicator drum comprises a disk 121 rigidly secured to the indicator drum and, in the present instance, this disk is mounted on the shaft 27 at one side of the drum. Cooperating with the disk 121 are two locking disks 122 and 123 which are arranged on opposite sides of the plane of the disk 121 and are eccentrically mounted so that their peripheries may be moved into and out of contact with the respective faces of the disk 121. Preferably the two disks 121 and 123 are carried by a bracket 124 mounted on the frame member 28 and are connected one to the other by a link 125 to cause them to move in unison. Movement is imparted to the disks 122 and 123 from the cam shaft 85 and, as here shown, a rock arm 126 is mounted on a shaft 127 and connected with a rock arm 129 having a pin 130 which extends into the cam groove 131 of a cam 132 secured to the cam shaft. At its upper end the arm 126 has a laterally extending portion 133 which is slotted to receive a pin 134 secured to the face of the disk 122 so that the rocking movement of the arm 126 will rotate the disk 122 into engagement with the disk 121 and will, through the medium of the link 125, likewise rotate the disk 123. To enable the movement of the locking disks to be regulated I have established an adjustable connection between the rock arm 126 and the arm 129. As here shown, the arm 126 is loosely mounted on the shaft 127 and the arm 129 has rigidly connected therewith an arm 135 which is provided with laterally extending lugs 136 which embrace the arm 126. Mounted in the lugs 136 are screws 137 which establish the connection between the arm 126 and the arm 135 and by adjusting these screws the relation of the arm 126 to the cam can be varied and the operation of the locking disks properly timed. It will be noted that the cam 131 is timed to operate the locking disks upon the first movement of the crank shaft and prior to the movement of the inner shaft 78 of the printing mechanism and to then hold the locking disks in their operative positions until the cam shaft has completed its rotation. It is desirable that the indicator drum and its shaft 27 be locked on both sides of the shaft to prevent any tendency to impose undue strains upon the shaft which might cause it to spring or to be otherwise injuriously affected. I have, therefore, provided a second set of locking disks arranged to engage that edge of the main disk 121 opposite the first mentioned disks. These locking disks are similar to those above described and consist of two eccentric disks 122ᵃ and 123ᵃ connected by a link 125ᵃ. The disk 123ᵃ is connected with the disk 123 by a link 138 which is so arranged as to cause the disks of both pairs to simultaneously engage the main disk 121. In this manner the drum is locked in its indicating position and held rigidly in that position during the operation of the printing mechanism.

The printing mechanism also comprises other type carriers to print various data on the record, as will be seen from a reference to Figs. 6, 7 and 19ᵃ to 19ᵉ. These type carriers consist in the present instance of three type wheels 139, 140 and 141 adapted to print respectively an arbitrary number, such as an identifying number for the operator or the department in which the scale is placed, the month and the day of the month. These type carriers are loosely mounted on the hollow shaft 78 and have the printing type arranged about the lower portions of their circumferences and are provided on the front portion of their circumferences with corresponding indications, which are readable through a sight opening 142 in the casing. They are preferably set by hand and to this end their upper edges may be serrated and the casing provided with an opening having a closure 143 to permit access to be had to these type wheels for setting the same. They are held in their set positions by means of pawls 144 having V-shaped noses which enter V-shaped recesses in the rear edges of the type wheels. The several pawls are loosely mounted on the shaft 127 and their movement is controlled by a rock arm 146 also mounted on said shaft. As here shown, each pawl is independently movable on the shaft and is held normally in its operative position by a spring 147, the spring being of such a tension that the pawls will yield to permit the rotation of the type wheels. In order to lock the type wheels against movement after the printing operation has begun, the cam shaft 85 has mounted thereon a disk 148 having therein a recess 149 arranged in line with the end of the rock arm 146. Rigidly secured to the arm 146 and extending above the shaft 127 are other arms 150 carrying a rod 151 which extends in the rear of the several pawls 144. So long as the cam shaft is in its normal position the recess 149 will be in line with the end of the rock arm 146 and the several pawls will be free to move outwardly, but as soon as the disk has been moved from its normal position by the rotation of the crank shaft the recess will be moved out of line with the end of the arm 146 and the periphery of the disk will lock that arm against rocking movement, thereby locking the pawls in engagement with the respective type wheels until the cam shaft has completed its rotation.

The printing mechanism also comprises a type carrier and an indicating device to print and indicate the position of the indicating device 57 which indicates the position of the fulcrum for the counting device. The type wheel is shown at 152 and has rigidly secured thereto the indicator drum 153. These parts are rotatably mounted on the hollow shaft 78 and, as here shown, are carried by a sleeve 154 journaled on said shaft by means of antifriction bearings 155. Movement is imparted to the printing and indicating wheel by the rotation of the setting rod 46 which adjusts the fulcrum of the counting lever. As will be seen in Fig. 3 the rear end of this shaft is journaled in a bearing 156 of the main frame and has secured thereto a beveled gear 157, which meshes with a corresponding gear 158 secured to the lower end of a shaft 159 which extends upwardly in the upright portion of the casing and has at its upper end a beveled gear 160 which meshes with a gear 161 rigidly secured to the sleeve 154. Consequently, the rotation of the setting rod will shift the combined printing and indicating wheel and the type and indications are so arranged on this wheel that they will correspond to the indication on the indicator 57. The indicator drum is arranged in front of a sight opening 162 in the main casing through which the indications may be read. In order to take up any lost motion and prevent back lash in the driving gearing for the printing and indicating wheel I have secured to the sleeve 154 a gear 163 with which meshes a toothed segment 164 carried by an arm 165 pivotally mounted on the frame member 29 at 166. This segment is weighted, as shown at 167, so that it constantly resists the forward movement of the type wheel and indicator and holds the gearing always in firm contact. In order to lock the type wheel and indicator against movement during the printing operation I have secured to the sleeve 154 (Figs. 7 and 17) a disk 168 similar to the disk 121 and have provided eccentric locking disks 169, 170, 171 and 172 which are arranged and operated in the same manner as the disks 122 and 123, heretofore described, and are actuated from the cam shaft 85 by rock arms 200 and 201 corresponding to the rock arms 126 and 129 of Fig. 9.

Any suitable printing mechanism may be employed for taking a record from the printing drum and the associated type wheels. I prefer, however, to so construct this mechanism that a record will be taken from one only of the several type carriers of the printing drum 75. I have, therefore, provided a platen 173 which is carried by an arm 174 mounted on the shaft 127. This arm 174 is provided with a laterally extending pin 175 which enters the groove 176 in the cam 177 which is so shaped that operative movement will be imparted to the platen at the proper time during the cycle of operations of the printing mechanism. In the present device I employ an inking ribbon 178 which is carried by rollers 179 and 180 and extends across the faces of the several type carriers and between the same and the platen. The platen 173 is of sufficient width to take an impression from each of the type wheels 139, 140, 141 and 152 but does not take an impression from any part of the printing drum, or type carriers, 35 to 39. To take the impression from the type carriers which print the record of the count I provide a separate platen 181 which is carried by an arm 182 mounted on a rod, or shaft 183, mounted on that side of the printing line opposite the shaft 127. This platen is connected with the platen 173 in such a manner that it will be operated simultaneously therewith. As here shown, the arm 174 supports one end of a rod 184 the opposite end of which is supported on a second arm 185 also carried by the shaft 127. The inner end of the arm 182 is slotted to receive the rod 184 and, consequently, the operative movement of the platen 173 will impart similar movement to the platen 181. The platen 181 is of sufficient width to print from one type carrier only and it is shifted transversely of the printing drum to bring it into operative relation with a selected type carrier. To this end I have, in the present instance, mounted the shaft 183, by which the platen 181 is carried, for axial movement which will carry the platen to the selected position. This movement may be imparted to the shaft in any suitable manner but, as here shown, the shaft has secured thereto adjacent to the indicator drum 26 a stud 186 which extends through a slot 187 (see Fig. 1) in the casing and supports an indicator, or pointer, 188 adjacent to the sight opening 40. The arrangement of this counter with relation to the platen 181 is such that when the pointer indicates a selected scale, or series of indications, on the indicator drum 26 the platen will be in operative relation to the type carrier corresponding to that scale or series of indications. It will be noted, on Fig. 1, that each of the several scales, or series of indications on the indicator drum, are lettered with an identifying letter. The letter W is applied to that section of the drum which gives the weight of the article and the letters, A, B, C and D are applied to the remaining sections, which indicate the count. These letters are printed on the record and to this end I have mounted adjacent to each type carrier a fixed type bar 189 having on its face the letter which identifies the particular scale or series of indications the record of which is printed by that type carrier. These fixed type bars also carry a small mark such as an arrow, as shown at 190 in Figs. 19ª to 19ᵉ, which is arranged on the exact printing line and serves to indicate on the record the exact line of the scale which registers with the reading line at the sight opening. It will be noted that because of the closeness of the lines of each scale several of these are printed on each record and by the use of this identifying mark, which is permanently fixed on the printing line, the exact line or graduation is readily determined. The platen 181 is properly alined with the type carriers and is locked against movement during the printing operation by means of a pawl 191 pivotally mounted on the frame member 29 and engaging in V-shaped recesses 192 in the edge of the slidable shaft 184, which is held against rotation. This pawl has a finger 193 extending through the frame member 29 and arranged in the path of an arm 194 which is mounted on the shaft 82 and is acted upon by a spring 195 to hold the same normally in its lowermost position with the nose of the pawl in engagement with the shaft 192. However, the arm 194 will yield, when the parts are in their normal position, to permit the pawl to ride in and out of the recesses when longitudinal pressure is applied to the shaft 183. The pawl is locked firmly in the recesses during the printing operation and to this end an arm 196 is rigidly secured to the arm 194 and provided with a nose 197 arranged in line with a disk 198 mounted on the shaft 85 and having a recess 199 arranged normally in alinement with the nose 197, thus permitting the free movement of the arm 194. As soon as the cam shaft is moved from its normal position the periphery of the disk 198 is moved into line with the nose 197 and the arm 194 is locked against movement.

The operation of the mechanism will be understood from the foregoing description of the several parts thereof and it will be apparent that I have provided a counting scale which can be adjusted to accommodate it to articles of various weights and which will accurately count the articles placed upon the platform or other receptacle; and that this mechanism is of a very simple construction and may be very quickly and easily adjusted. Further, it will be apparent that I have provided a printing device for taking a record from the scale indicator, which is operated independently of but controlled by said indicator, the construction and arrangement being such that no burden is imposed upon the indicator and no interference whatever is had with its operation, thereby enabling exceedingly fine indications to be made and a record printed thereof. After the articles to be counted have been placed upon the platform and the indicator drum has assumed its indicating position the operating crank is turned through two complete revolutions. The first portion of this movement causes the locking devices for the indicator drum and for the combined printing and indicating wheel to operate, thus firmly securing these parts against rotation. The further movement of the crank results in the rotation of the printing drum until it is brought into line with the indicating drum at which time it is locked thereto and disconnected from the crank so that the latter can continue its movement. This continued movement of the crank causes the operation of the platens which take the impression from the type carriers on the card which is inserted between the platens and the type carriers, as shown in Fig. 14. The continued movement of the crank causes a reversal of the movement of the hollow shaft which actuates the printing drum and this shaft moves rearwardly until the front wall of the recess 96 in the disk 95, which projects beyond the periphery of the disk, as shown at 203 in Fig. 13, engages the finger 100 of the locking plate 98, thus carrying this plate and the lever 97 with which it is connected rearwardly, and releasing the rock arm 103 from the stop, or pin, 107. As soon as the rock arm is released the spring 105 will move the locking plate inwardly, thus disconnecting the same from the indicator drum and moving the finger 100 into the notch 96. The further movement of the crank restores the printing drum to its normal position and by returning the cam 132 (Fig. 9) to its normal position, releases the printing drum for further operation. It will also be noted that when the adjusting knob for the counting device has been restored to its initial position, it will be automatically locked in that position with the indicator at zero and adapted to indicate weight, thus enabling the mechanism to be quickly and accurately restored to its initial position.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a device of the character described, a weighing mechanism comprising a lever of the second order having an adjustable pivotal connection, computing mechanism operatively connected with said weighing mechanism, and a normally operable device to adjust said pivotal connection to vary the influence of said lever on said actuating mechanism.

2. In a device of the character described, weighing mechanism comprising a lever of the second order having an adjustable fulcrum, computing mechanism operatively connected with said weighing mechanism, and a normally operable device to adjust said fulcrum to vary the influence of said lever on said computing mechanism.

3. In a device of the character described, weighing mechanism comprising a lever movable about a transverse axis, computing mechanism having constant operative connection with said lever, and a normally operable device for adjusting the axis of said lever to vary the influence of said lever upon said computing mechanism.

4. In a device of the character described, weighing mechanism, computing mechanism comprising an indicator, said weighing mechanism, having a lever operatively connected between its ends therewith, a fulcrum for one end of said lever adjustable relatively thereto, an operative connection between said lever and said indicator and a normally operable device for adjusting said fulcrum.

5. In a device of the character described, weighing mechanism, a computing device comprising an indicator, said weighing mechanism having a lever operatively connected between its ends therewith, one end portion of said lever having a longitudinal slot, a normally fixed fulcrum adjustably mounted in said slot, and an operative connection between the other end portion of said lever and said indicator.

6. In a device of the character described, weighing mechanism, a computing device comprising an indicator, said weighing mechanism having a lever operatively connected between its ends therewith, one end portion of said lever having a longitudinal slot, a normally fixed fulcrum adjustably mounted in said slot, an operative connection between the other end portion of said lever and said indicator, and screw operated means for adjusting said fulcrum.

7. In a device of the character described, an indicator, weighing mechanism comprising a lever pivotally mounted between its ends thereon and having one end operatively connected with said indicator, and fulcrum for the other end of said lever, a screw threaded support for said fulcrum, and a screw threaded part connected with said support and held against axial movement.

8. In a device of the character described, an indicator, weighing mechanism comprising a lever pivotally mounted between its ends on a part of said weighing mechanism and having one end operatively connected with said indicator, a fulcrum for the other end of said lever, a sleeve rigidly secured to said fulcrum and having internal screw threads, a rotatable shaft held against axial movement and having a screw threaded portion mounted in said sleeve, and means to hold said sleeve against rotation of said shaft.

9. In a device of the character described, an indicator, weighing mechanism comprising a lever pivotally mounted between its ends on a part of said weighing mechanism and having one end operatively connected with said indicator, a fulcrum for the other end of said lever, a sleeve rigidly secured to said fulcrum and having internal screw threads, a rotatable shaft held against axial movement and having a screw threaded portion mounted in said sleeve, means to hold said sleeve against rotation with said shaft, and means to lock said shaft against rotation.

10. In a device of the character described, an indicator, weighing mechanism comprising a lever pivotally connected between its ends with a part of said weighing mechanism and operatively connected with said indicator, a fulcrum for said lever arranged near one end thereof and adjustable relatively thereto, and a normally rotatable part for adjusting said fulcrum.

11. In a device of the character described, an indicator, weighing mechanism comprising a lever operatively connected with said indicator, a fulcrum for said lever adjustable relatively thereto, a rotatable shaft for adjusting said fulcrum, and locking device for securing said rotatable shaft in adjusted positions.

12. In a device of the character described, an indicator, weighing mechanism comprising a lever operatively connected with said indicator a fulcrum for said lever adjustable relatively thereto, a rotatable shaft for adjusting said fulcrum, a disk secured to said shaft, and a locking member arranged to engage said disk.

13. In a device of the character described, an indicator, weighing mechanism comprising a lever operatively connected with said indicator, a fulcrum for said lever adjustable relatively thereto, a rotatable shaft for adjusting said fulcrum, an indicator carried by said rotatable shaft, and a fixed part cooperating with said indicator to indicate the position of said fulcrum.

14. In a device of the character described, an indicator, weighing mechanism comprising a lever operatively connected with said indicator, a fulcrum for said lever adjustable relatively thereto, a rotatable shaft for adjusting said fulcrum, an indicator mounted on said shaft for rotation therewith and for movement lengthwise thereof, a fixed part cooperating with said indicator to indicate the position of said fulcrum, and means controlled by the rotation of said shaft for imparting axial movement to the last mentioned indicator relatively to said shaft.

15. In a device of the character described, an indicator, weighing mechanism comprising a lever operatively connected with said indicator, an adjustable fulcrum for said lever, a rotatable shaft for adjusting said fulcrum, an indicator drum mounted on said shaft for rotation therewith and for movement axially thereof and having a spiral groove with graduations along the edge thereof, a pointer supported adjacent to the periphery of said drum, and a fixed part extending into said groove.

16. In a device of the character described, an indicator, weighing mechanism comprising a lever operatively connected with said indicator, an adjustable fulcrum for said lever, a rotatable shaft for adjusting said fulcrum, an indicator drum mounted on said shaft for rotation therewith and for movement axially thereof and having a spiral groove with graduations along the edge thereof, a pointer supported adjacent to the periphery of said drum, a fixed part extending into said groove, an actuating rod extending through said drum and connected therewith near its periphery, and a rigid connection between said rod and said shaft.

17. In a device of the character described, an indicator, weighing mechanism comprising a lever operatively connected with said indicator, an adjustable fulcrum for said lever, a rotatable shaft for adjusting said fulcrum, an indicator drum mounted on said shaft for rotation therewith and for movement axially thereof and having a spiral groove with graduations along the edge thereof, a pointer supported adjacent to the periphery of said drum, a fixed part extending into said groove, an actuating rod extending through said drum and connected therewith near its periphery, rigid connections between said rod and said shaft, one of said connections comprising a disk, and an eccentric locking member mounted on a fixed support and arranged to engage said disk.

18. In a device of the character described, an indicator, weighing mechanism comprising a lever operatively connected with said indicator, an adjustable fulcrum for said lever, a rotatable shaft for adjusting said fulcrum, an indicator mounted on said rotatable shaft for rotation therewith and for movement lengthwise thereof, a fixed part cooperating with said indicator to indicate the position of said fulcrum, means controlled by the rotation of said shaft for imparting axial movement to said indicator relatively to said shaft, an operating device connected with said shaft, and a stop adjustably mounted on said operating device.

19. In a device of the character described, an indicator, weighing mechanism comprising a lever operatively connected with said indicator, an adjustable fulcrum for said lever, a rotatable shaft for adjusting said fulcrum, an indicator connected with said shaft to indicate the position of said fulcrum, an actuating device for said shaft, and an adjustable stop for said actuating device.

20. In a device of the character described, an indicator, weighing mechanism comprising a lever operatively connected with said indicator, an adjustable fulcrum for said lever, a rotatable shaft for adjusting said fulcrum, an indicator connected with said shaft to indicate the position of said fulcrum, an actuating device for said shaft, a bushing adjustably mounted in said actuating device, a stop mounted eccentrically in said bushing, and means for adjusting said bushing relatively to said actuating device.

21. The combination with weighing mechanism, of a computing device having a constant operative connection with said weighing mechanism and comprising an indicator having a series of indications spaced equal distances apart, and a normally operable device for so adjusting said weighing mechanism that said indicator will be moved the space of a single indication by any one of a plurality of units of different weights which may be placed upon said weighing mechanism.

22. The combination with weighing mechanism, of a computing device operatively connected with said weighing mechanism and comprising an indicator having a plurality of series of indications, the indications of each series being spaced equal distances apart and the indications of the several series being spaced different distances apart, and a normally operable device for so adjusting said weighing mechanism that said indicator will be caused to move through the space of a single indication of a selected series when a unit is placed on said weighing mechanism.

23. The combination with weighing mechanism, of a computing device operatively connected with said weighing mechanism and comprising an indicator having a plurality of series of indications, and a normally operable device for adjusting said weighing mechanism to cause the unit indication of a selected series to be brought into registering position when a unit is placed on said weighing mechanism.

24. The combination with weighing mechanism, of a computing device operatively connected therewith and comprising a rotary drum having a circumferential series of indications, and a normally operable device for adjusting said weighing mechanism to cause said drum to be rotated a distance equal to a single indication by any one of a plurality of units of different weight which may be placed upon said weighing mechanism.

25. The combination with weighing mechanism comprising a lever, of a computing drum having a plurality of series of indications arranged circumferentially thereof and operatively connected with the lever of said weighing mechanism, a fulcrum for said lever adjustable relatively thereto, and a normally operable device for adjusting said fulcrum.

26. The combination with weighing mechanism comprising a lever, of a rock shaft connected with said lever, an actuating arm carried by said rock shaft, a rotatable drum having a series of indications extending circumferentially thereof, an operative connection between said actuating arm and said drum, and an adjustable fulcrum for said lever.

27. The combination with weighing mechanism comprising a lever, of a rock shaft connected with said lever, an actuating arm carried by said rock shaft, a rotatable drum having a plurality of series of indications extending circumferentially thereof, an operative connection between said actuating arm and said drum, and an adjustable fulcrum for said lever.

28. The combination with weighing mechanism comprising a lever, of a rock shaft connected with said lever, an actuating arm carried by said rock shaft, a rotatable drum having a plurality of series of indications extending circumferentially thereof, an operative connection between said actuating arm and said drum, a normally stationary fulcrum for said lever, and means for adjusting said fulcrum lengthwise of said lever.

29. The combination with weighing mechanism, of a computing device separate from and operatively connected with said weighing mechanism, a tare beam operatively connected with said weighing mechanism, and a normally operable device for adjusting said weighing mechanism to accommodate the same to units of different weights.

30. The combination with weighing mechanism comprising a lever, of an indicator operatively connected with said lever and comprising a series of indications, an adjustable fulcrum for said lever, means for adjusting said fulcrum, and a device supported independently of said weighing mechanism for indicating the adjusted position of said fulcrum.

31. The combination with weighing mechanism comprising a lever, of an indicator operatively connected with said lever and comprising a series of indications, an adjustable fulcrum for said lever, a rotatable device for adjusting said fulcrum with relation to said lever, an indicator drum rotatable with said adjusting device, and a fixed part cooperating with said drum to indicate the adjusted position of said fulcrum.

32. The combination with weighing mechanism comprisnig a lever, of an indicator operatively connected with said lever and comprising a series of indications, an adjustable fulcrum for said lever, a rotatable device for adjusting said fulcrum with relation to said lever, a drum connected with said rotatable device for rotation therewith and for movement axially thereof and having a series of indications arranged spirally thereof, means for imparting axial movement to said drum when said actuating device is rotated, and a fixed part cooperating with said drum to indicate the adjustment of said fulcrum.

33. The combination with weighing mechanism, of a movable indicator operatively connected with said weighing mechanism, and means for varying the movement of said weighing mechanism with relation to said indicator to vary the influence of said weighing mechanism on said indicator, of a type carrier mounted independently of said indicator and movable independently thereof, and means controlled by the position of said indicator for regulating the movement of said type carrier.

34. The combination with weighing mechanism, of a movable indicator operatively connected with said weighing mechanism, means for varying the movement of said weighing mechanism with relation to said indicator to vary the influence of said weighing mechanism on said indicator, of a type carrier mounted independently of said indicator and movable independently thereof, means controlled by the position of said indicator for regulating the movement of said type carrier, and means for locking said indicator against movement during the adjustment of said type carrier.

35. The combination with weighing mechanism, of a movable indicator operatively connected with said weighing mechanism, means for varying the movement of said weighing mechanism with relation to said indicator to vary the influence of said weighing mechanism on said indicator, of a type carrier mounted independently of said indicator and movable independently thereof, a device for alining said type carrier with said indicator and comprising an operative part connected with said type carrier, and a part connected with said indicator to control the operation of said operative part.

36. The combination with a scale comprising a movable indicator, of a type carrier mounted independently of said indicator and movable independently thereof, and a device for alining said type carrier with said indicator and comprising an operative part connected with said type carrier and movable into locked engagement with said indicator and a part connected with said indicator to control the locking operation of said operative part.

37. The combination with a scale comprising a movable indicator, of a type carrier mounted independently of said indicator and movable independently thereof, and a device for securing said type carrier in a position corresponding to the position of said indicator and comprising an operable part connected to and movable with said type carrier, and a part connected to and movable with said indicator and arranged to cause the operation of said operable part.

38. The combination with a scale comprising a movable indicator, of a type carrier mounted independently of said indicator and movable independently thereof, and a device for securing said type carrier in a position corresponding to the position of said indicator and comprising cooperating locking parts connected respectively with said indicator and said type carrier, an actuating member for one of said locking parts, and a member connected with said indicator for causing movement to be imparted to said actuating member.

39. The combination with a scale having a rotatable indicator, of a type carrier rotatable about an axis coincident with the axis of said indicator, means for rotating said type carrier independently of said indicator, and means controlled by said indicator for interrupting the movement of said type carrier when it has been moved to a position corresponding to the position of said indicator.

40. The combination with a scale having a rotatable indicator, of a type carrier rotatable about an axis coincident with the axis of said indicator, means for rotating said type carrier independently of said indicator, and means controlled by said indicator for interrupting the movement of said type carrier when it has been moved to a position corresponding to the position of said indicator, and means for locking said indicator against movement during the adjustment of said type carrier.

41. The combination with a scale having a movable indicator, of a type carrier movable independently of said indicator, a printing device for taking a record from said type carrier, an operating device for imparting movement to said type carrier and said printing device, and means controlled by said indicator to secure said type carrier in a position corresponding to the position of said indicator and to disconnect the same from said operating device.

42. The combination with a scale having a movable indicator, of means for locking said indicator in an adjusted position, a type carrier, a printing device to take a record from said type carrier, an operating device to actuate said locking device, said type carrier and said printing mechanism, and means controlled by said indicator for securing said type carrier in a position corresponding to the position of said indicator and for disconnecting the same from said operating device.

43. The combination with a scale having a movable indicator, of a type carrier movable independently of said indicator, a locking device to secure said type carrier against movement, an operating device, means for normally connecting said operating device with said type carrier, and a part connected with said indicator and arranged to actuate said locking device and said connecting means to first secure said locking device in a position corresponding to the position of said indicator and to then disconnect said operating device from said type carrier.

44. The combination with a scale comprising a rotatable indicator, of a type carrier independent of said indicator, a shaft for said type carrier, a second shaft, an operating device connected with said second shaft, means for normally connecting said shafts for rotation in unison, a locking device to secure said type carrier in a position corresponding to the position of said indicator, and a part connected with said indicator to actuate said locking device and to disconnect said shafts.

45. The combination with a scale comprising a rotatable indicator, of a type carrier independent of said indicator, a shaft for said type carrier, a second shaft, an operating device connected with said second shaft, means for normally connecting said shafts for rotation in unison, a locking device to secure said type carrier in a position corresponding to the position of said indicator, a part connected with said indicator to cause the operation of said locking device and to disconnect said shafts, a printing device to take a record from said type carrier, and means actuated by said operating device after said shafts have been disconnected to operate said printing device.

46. The combination with a scale comprising a rotatable indicator, of a type carrier independent of said indicator, a shaft for said type carrier, a second shaft, an operating device connected with said second shaft, means for normally connecting said shafts for rotation in unison, a locking device to secure said type carrier in a position corresponding to the position of said indicator, a part connected with said indicator to actuate said locking device and to disconnect said shafts, and a device operated by the initial movement of said operating device to lock said indicator against movement.

47. The combination with scale comprising a rotatable indicator, of two parallel shafts, an operating device connected with one of said shafts, a type carrier connected with the other of said shafts, a device connected with the shaft for said type carrier to normally connect said shaft with the other shaft and to lock said first mentioned shaft against rotation when said device is moved into a position to disconnect the two shafts, and means connected with said indicator to control the operation of said device.

48. The combination with a scale having a rotatable indicator, of a pair of telescoping shafts, an operating device connected with one of said shafts, a type carrier mounted on the other of said shafts, a locking member carried by the last mentioned shaft and movable into and out of a position to lock said shaft and said type carrier against rotation, the other of said shafts having a part to cooperate with said locking member when the latter is in its inoperative position to cause said shafts to rotate in unison, and means controlled by said indicator to move said locking member into locking position and to disconnect said shafts.

49. The combination with a scale having a rotatable member adapted to be actuated by the load on said scale, of a rotatable type carrier, a locking member connected with said type carrier and movable into and out of a locking position, and means connected with said indicator for causing the operation of said locking member when said type carrier is moved into a position corresponding to the position of said indicator.

50. The combination with a scale having a rotatable indicator, of a rotatable type carrier, a locking member connected with said type carrier and movable into and out of a locking position, and means connected with said indicator for causing the operation of said locking member when said type carrier is moved into a position corresponding to the position of said indicator.

51. The combination with a scale having a rotatable indicator, of a rotatable type carrier, a locking member connected with said type carrier and movable into and out of a locking position, a part connected with said indicator to cooperate with said locking member, an actuating device for said locking member, and means connected with said indicator for causing the operation of said actuating device.

52. The combination with a scale having a rotatable indicator, a shaft rotatable independently of said indicator, of an operating device for said shaft, a disk secured to said shaft, a second shaft rotatably mounted on the first mentioned shaft, a type carrier mounted on said second shaft, a lever secured to said second shaft, a locking member connected with said lever and movable relatively thereto and having a part to engage said disk and connect said shafts one to the other when said locking member is in its inoperative position, and means controlled by the position of said indicator for actuating said locking member.

53. The combination with a scale having a rotatable indicator, of a shaft rotatable independently of said indicator, an operating device for said shaft, a disk secured to said shaft and having a peripheral notch, a second shaft rotatably mounted on the first mentioned shaft, a type carrier mounted on said second shaft, a lever secured to said second shaft, a locking member connected with said lever for movement into and out of locking position and having a part adapted to enter the notch in said disk when said locking member is in its inoperative position, an actuating device mounted on said lever and operatively connected with said locking member, and a part connected with said indicator and arranged to cause the operation of said actuating device.

54. The combination with a scale comprising a rotatable indicator having a locking member rigidly connected therewith, of a shaft rotatable about the axis of said indicator, an operating device connected with said shaft, a disk secured to said shaft and having a peripheral notch, a second shaft rotatably mounted on the first mentioned shaft, a type carrier mounted on said second shaft, a lever secured to said second shaft, a locking member connected with said lever for movement into and out of a position to engage the locking member of said indicator and having a part adapted to enter the notch in said disk when said locking member is in its inoperative position, an actuating device for said locking member having a trip finger and a part rigidly connected with said indicator and arranged in the path of said trip finger.

55. The combination with a scale comprising a rotatable indicator having a locking member rigidly connected therewith, a shaft rotatable about the axis of said indicator, an operating device connected with said shaft, a disk secured to said shaft and having a peripheral notch, a second shaft rotatably mounted on the first mentioned shaft, a type carrier mounted on said second shaft, a lever secured to said second shaft, a locking member connected with said lever for movement into and out of a position to engage the locking member of said indicator and having a part adapted to enter the notch in said disk when said locking member is in its inoperative position, an actuating device for said locking member having a trip finger and a part rigidly connected with said indicator and arranged in the path of said trip finger, said disk having at the forward edge of said notch a shoulder adapted to engage said part of said locking member when reverse movement is imparted to the first mentioned shaft.

56. The combination with a scale comprising a rotatable indicator having two locking members rigidly connected therewith and arranged on opposite sides of its axis, of a shaft rotatable about the axis of said indicator, means for rotating said shaft independently of said indicator, a disk secured to said shaft and having a notch in the periphery thereof, a second shaft rotatably mounted on the first mentioned shaft, a type carrier mounted on said second shaft, a lever secured to said second shaft, a locking member connected with said lever for movement into and out of locking engagement with one of the locking members of said indicator and having a part adapted to enter the notch in said disk when said locking member is in its inoperative position, an actuating device for said locking member, a part connected with said indicator to cause the operation of said actuating device, a second locking member connected with said lever for movement into and out of engagement with the other locking member of said indicator, and means actuated by the movement of the first mentioned locking member to impart a similar movement to the second locking member.

57. The combination with a scale comprising a rotatable indicator having two locking members rigidly connected therewith and arranged on opposite sides of its axis, of a shaft rotatable about the axis of said indicator, means for rotating said shaft independently of said indicator, a disk secured to said shaft and having a notch in the periphery thereof, a second shaft rotatably mounted on the first mentioned shaft, a type carrier mounted on said second shaft, a lever secured to said second shaft, a locking member connected with said lever for movement into and out of locking engagement with one of the locking members of said indicator and having a part adapted to enter the notch in said disk when said locking member is in its inoperative position, an actuating device for said locking member, a part connected with said indicator to cause the operation of said actuating device, a second locking member connected with said lever for movement into and out of engagement with the other locking member of said indicator, means actuated by the movement of the first mentioned locking member to impart a similar movement to the second locking member, and an adjustable connection between said means and one of said locking members.

58. The combination with a scale comprising a rotatable indicator having a locking member rigidly connected therewith, of a shaft rotatable about the axis of said indicator and independently thereof, an operating device for said shaft, a disk secured to said shaft and having a notch in the periphery thereof, a second shaft rotatably mounted on the first mentioned shaft, a type carrier mounted on said second shaft, a lever secured to said second shaft, a locking member connected with said lever for movement into and out of engagement with the locking member of said indicator, and having a part arranged to enter the recess in said disk when said locking member is in its inoperative position, means controlled by the position of said indicator to impart movement to said locking member, a second disk rigidly secured to the first mentioned shaft and having a recess in its periphery, and a part adjustably mounted on said locking member and adapted to lie in the recess of said second disk when the first mentioned shaft is in its normal position.

59. The combination with a scale comprising a rotatable indicator, of a type carrier adjustable relatively to said indicator, means controlled by said indicator to determine the adjustment of said type carrier, a locking member rigidly connected with said indicator, cooperating locking members movable into and out of operative engagement with the first mentioned locking member, and an operating device connected with said locking members and said type carrier and arranged to actuate said locking members before movement is imparted to said type carrier.

60. The combination with a scale comprising a rotatable indicator, of a type carrier adjustable relatively to said indicator, means controlled by said indicator to determine the adjustment of said type carrier, a disk rigidly connected with said indicator, a pair of locking disks eccentrically mounted on opposite sides of the first mentioned disk, an operative connection between said disks to cause them to move in unison, and means for actuating said disks.

61. The combination with a scale comprising a rotatable indicator, of a type carrier adjustable relatively to said indicator, means controlled by said indicator to determine the adjustment of said type carrier, a disk rigidly connected with said indicator, a pair of locking disks eccentrically mounted on opposite sides of the first mentioned disk, an operative connection between said disks to cause them to move in unison, a rock arm operatively connected with one of the last mentioned disks, and cam controlled means for actuating said rock arm.

62. The combination with a scale comprising a rotatable indicator, of a type carrier adjustable relatively to said indicator, means controlled by said indicator to determine the adjustment of said type carrier, a disk rigidly connected with said indicator, a pair of locking disks eccentrically mounted on opposite sides of the first mentioned disk, an operative connection between said disks to cause them to move in unison, a rock arm operatively connected with one of the last mentioned disks, and cam controlled means for actuating said rock arm, and means for adjusting said rock arm with relation to said cam.

63. In a mechanism of the character described, a rotatable member, a locking device therefor comprising a disk rigidly connected with said rotatable member, a pair of disks eccentrically mounted on opposite sides of the plane of the first mentioned disk, a connection between said disks to cause them to rotate in unison, and means for actuating said disks to cause them to grip the first mentioned disk between them.

64. In a mechanism of the character described, a rotatable member and a locking device therefor comprising a disk rigidly connected with said rotatable member, a pair of disks eccentrically mounted on opposite sides of the plane of the first mentioned disk, a connection between said disks to cause them to rotate in unison, an actuating member operatively connected with one of said eccentrically mounted disks, and a cam for operating said actuating means.

65. In a mechanism of the character described, a rotatable member and a locking device therefor comprising a disk rigidly connected with said rotatable member, a pair of disks eccentrically mounted on opposite sides of the plane of the first mentioned disk, a connection between said disks to cause them to rotate in unison, means for actuating said disks to cause them to grip the first mentioned disk between them, a second pair of disks eccentrically mounted on opposite sides of the plane of the first mentioned disk and arranged on that side of the axis of the first mentioned disk opposite the first pair of eccentrically mounted disks, the disks of said second pair being connected one with the other and one of said disks being operatively connected with one of the disks of the first mentioned pair.

66. The combination with weighing mechanism of a movable indicator operatively connected with said weighing mechanism and having a plurality of series of indications, and means for adjusting said weighing mechanism to vary its influence on said indicator, of a plurality of type carriers corresponding to the several series of said indications on said indicator, means for adjusting said type carriers to positions corresponding to the positions of the respective series of indications on said indicator, and means for taking a record from a selected one of said type carriers.

67. The combination with a scale comprising movable indicator having a plurality of series of indications, of a plurality of type carriers corresponding to the several series of indications on said indicator, means for adjusting said type carriers to positions corresponding to the positions of the respective series of indications on said indicator, a fixed type bar arranged alongside of each type carrier and adapted to print a mark on the printing line adjacent to the record printed from said type carrier, and means for taking a record from a selected type carrier and its fixed type bar.

68. The combination with a scale comprising a rotatable drum having a plurality of series of indications, of a plurality of rotatable type carriers having printing type corresponding to the respective series of indications on said indicator, a fixed type bar arranged alongside of each of said type carriers and adapted to print a mark on the true printing line, means controlled by said indicator for adjusting said type carriers to positions corresponding to the positions of the respective series of indications on said indicator, and means for taking a record from a selected type carrier and its fixed type bar.

69. The combination with a scale comprising a rotatable drum having a plurality of series of indications, a plurality of type carriers corresponding to the indications of the respective series of indications on said indicator, means controlled by said indicator for adjusting said type carriers to positions corresponding to the positions of the respective series of indications on said indicator, a platen movable into operative relation with any one of said type carriers, and means for actuating said platen.

70. The combination with a scale comprising a rotatable drum having a plurality of series of indications, a plurality of type carriers having type corresponding to the indications of the respective series of indications on said indicator, means controlled by said indicator for adjusting said type carriers to positions corresponding to the positions of the respective series of indications on said indicator, a platen movable into operative relation with any one of said type carriers, an adjusting device for said platen having a pointer to travel across said indicator to indicate the position of said platen, and means for actuating said platen.

71. The combination with a scale comprising a rotatable drum having a plurality of series of indications, a plurality of type carriers having type corresponding to the indications of the respective series of indications on said indicator, means controlled by said indicator for adjusting said type carriers to positions corresponding to the positions of the respective series of indications on said indicator, a platen movable into operative relation with any one of said type carriers, an operating device for actuating said platen, and means controlled by said operating device to lock said platen against adjustment before operative movement is imparted thereto.

72. The combination with a scale comprising a rotatable drum having a plurality of series of indications, a plurality of type carriers having type corresponding to the indications of the respective series of indications on said indicator, means controlled by said indicator for adjusting said type carriers to positions corresponding to the positions of the respective series of indications on said indicator, a platen movable into operative relation with any one of said type carries, a slidable shaft on which said platen is mounted, said shaft having notches therein, a pawl to engage said notches to hold said shaft against adjustment, an operating device, a disk rotated by said operating device and having a peripheral recess, a pivoted arm arranged to engage said pawl and control the movement thereof, and a second arm connected with the first mentioned arm and having a nose arranged in line with the peripheral recess of said disk when said operating device is in its normal position.

73. In a device of the character described, weighing mechanism, computing mechanism operatively connected with said weighing mechanism and comprising a rotatable indicator, a rotatable type carrier, means separate from said computing mechanism but controlled by said indicator for setting said type carrier, means for taking a record from said type carrier, and a normally operable device for adjusting said weighing mechanism to vary its influence on said computing mechanism.

74. In a device of the character described, weighing mechanism, a computing device operatively connected with said weighing mechanism and comprising a rotatable indicator having a plurality of series of indications extending circumferentially thereof, means for adjusting said weighing mechanism to vary its influence on said computing device, a plurality of rotatable type carriers having type corresponding to the respective series of indications on said indicator, means separate from said computing device but controlled by said indicator for setting said type carriers in positions corresponding to the positions of the respective series of indications on said indicator, and means for taking a record from a selected one of said type carriers.

75. In a device of the character described, weighing mechanism, a computing device operatively connected with said weighing mechanism and comprising an indicator, means for adjusting said weighing mechanism with relation to said computing device to accommodate the computing device to articles of different weights, a type carrier to print a record of the indications on said indicator, a second type carrier operatively connected with said adjusting means and adapted to print a record of the position of said computing device, and means for taking records from said type carriers.

76. In a device of the character described, weighing mechanism comprising a lever, a rotatable indicator operatively connected with said lever, an adjustable fulcrum for said lever, means for adjusting said fulcrum, a type carrier, means controlled by said indicator for moving said type carrier into a position corresponding to the position of said indicator, a second type carrier, and means controlled by the adjusting means for said fulcrum to move said second type carrier into a position to print a record of the adjustment of said fulcrum, and means to print records from said type carriers.

77. In a device of the character described, weighing mechanism comprising a lever, a rotatable indicator operatively connected with said lever, an adjustable fulcrum for said lever, means for adjusting said fulcrum, a type carrier, means controlled by said indicator for moving said type carrier into a position corresponding to the position of said indicator, a second type carrier, means controlled by the adjusting means for said fulcrum to move said second type carrier into a position to print a record of the adjustment of said fulcrum, means to print records from said type carriers, and a visual indicator connected to and rotatable with said second type carrier.

78. In a device of the character described, weighing mechanism, a computing device comprising an indicator having a plurality of series of indications, means for adjusting said weighing mechanism with relation to said computing device, a plurality of type carriers having type corresponding to the respective series of indications on said indicator, means controlled by said indicator for adjusting said type carriers to positions corresponding to the positions of the respective series of indications on said indicator, other type carriers mounted adjacent to the first mentioned type carriers, means independent of said indicator for adjusting said other type carriers, a platen for taking a record from said last mentioned type carriers, a second platen movable into operative relation with any one of the first mentioned type carriers, and means for actuating said platens.

79. In a device of the character described, weighing mechanism, a computing device comprising an indicator having a plurality of series of indications, means for adjusting said weighing mechanism with relation to said computing device, a plurality of type carriers having type corresponding to the respective series of indications on said indicator, means controlled by said indicator for adjusting said type carriers to positions corresponding to the positions of the respective series of indications on said indicator, other type carriers mounted adjacent to the first mentioned type carriers, means independent of said indicator for adjusting said other type carriers, a platen for taking a record from said last mentioned type carriers, a cam for actuating said platen, a second platen movable into operative relation with any one of the first mentioned type carriers, and an operative connection between said second platen and the first mentioned platen to cause them to be operated in unison.

80. In a device of the character described, weighing mechanism, a computing device operatively connected with said weighing mechanism and comprising an indicator, an adjustable type carrier, means controlled by said indicator for moving said type carrier into printing position, a fixed type block mounted alongside of said type carrier to print an indicating mark in a fixed relation to the printing line, and a platen to take a record from said type carrier and said type block.

81. In a device of the character described, a weighing mechanism comprising a lever having a pivotal connection which is adjustable to vary the power of said weighing mechanism according to a unit of computation, a normally operable device to adjust said pivotal connection, an adjustable type carrier controlled by said weighing mechanism, a fixed type block mounted adjacent to said type carrier to print an indicating mark in fixed relation to the printing line, and a platen to take a record from said type carrier and said type block.

82. In a device of the character described, a weighing mechanism comprising a lever having a pivotal connection which is adjustable to vary the power of said weighing mechanism according to a unit of computation, and a normally operable device to adjust said pivotal connection, an indicator operatively connected with said weighing mechanism, a type carrier adjustable relatively to and controlled by said indicator, a fixed type block mounted adjacent to said type carrier to print an indicating mark in fixed relation to the printing line, and a platen to simultaneously take a record from said type carrier and said type block.

83. In a mechanism of the character described, a computing device, weighing mechanism having constant operative connection with said computing device and adjustable relatively thereto to vary the power of said weighing mechanism according to a unit of computation, means for locking said weighing mechanism in the zero position of its adjustment with relation to said computing device, and a normally operable device to adjust said weighing mechanism.

84. In a mechanism of the character described, weighing mechanism, a computing device operatively connected with said weighing mechanism, means for adjusting said weighing mechanism with relation to said computing device to vary its influence on said computing device, and a stop to interrupt the return movement of said adjusting means when said weighing mechanism has been restored to its initial position.

85. In a mechanism of the character described, a computing device, weighing mechanism operatively connected with said computing device and adjustable relatively thereto, an indicator operatively connected with said computing device and adapted to indicate either weight or a computation, means to adjust said weighing device with relation to said computing device, and means for securing said adjusting means in a position to cause said indicator to indicate weight.

86. In a mechanism of the character described, a computing device, weighing mechanism operatively connected with said computing device and adjustable relatively thereto, an indicator operatively connected with said computing device and adapted to indicate either weight or a computation, means to adjust said weighing mechanism with relation to said computing device, and means for automatically locking said adjusting means in a position to cause said indicator to indicate weight.

87. In a mechanism of the character described, a computing device, weighing mechanism operatively connected with said computing device and adjustable relatively thereto, an indicator operatively connected with said computing device and adapted to indicate either weight or a computation, means to adjust said weighing mechanism with relation to said computing device, and an adjustable stop to interrupt the movement of said adjusting means when it is in a position to cause said indicator to indicate weight.

88. The combination with weighing mechanism comprising a lever and an adjustable fulcrum for said lever, of an indicator having constant operative connection with said lever, and a normally operable device supported independently of said weighing mechanism for adjusting said fulcrum relatively to said lever to cause said indicator to be moved different distances by an article of a given weight.

89. The combination with weighing mechanism comprising a movable part, an adjustable fulcrum for said movable part, of a computing device comprising an indicator, a constantly operative connection between said computing device and said weighing mechanism, a normally operative device for adjusting said fulcrum relatively to said movable part of said weighing mechanism to bring said indicator to a selected position prior to the computing operation.

90. The combination with weighing mechanism comprising a lever, an adjustable fulcrum for said lever, of a computing device comprising an indicator, a constantly operative connection between said lever and said indicator, and a normally operable device for adjusting said fulcrum relatively to said lever to bring said indicator to a selected position prior to the computing operation.

In testimony whereof, I affix my signature hereto.

EDWARD B. LOCKE.